US010774979B2

(12) United States Patent
Lombardi

(10) Patent No.: US 10,774,979 B2
(45) Date of Patent: Sep. 15, 2020

(54) MULTI-CLAMP STAND APPARATUS

(71) Applicant: Joseph Lombardi, Wharton, NJ (US)

(72) Inventor: Joseph Lombardi, Wharton, NJ (US)

( * ) Notice: Subject to any disclaimer, the term of this patent is extended or adjusted under 35 U.S.C. 154(b) by 0 days.

(21) Appl. No.: 16/253,325

(22) Filed: Jan. 22, 2019

(65) Prior Publication Data

US 2020/0232596 A1  Jul. 23, 2020

(51) Int. Cl.
*F16M 11/04*  (2006.01)
*F16M 11/10*  (2006.01)
*B25B 5/00*  (2006.01)

(52) U.S. Cl.
CPC ......... *F16M 11/046* (2013.01); *F16M 11/041* (2013.01); *F16M 11/10* (2013.01); *B25B 5/006* (2013.01); *F16M 2200/022* (2013.01); *F16M 2200/027* (2013.01); *F16M 2200/06* (2013.01)

(58) Field of Classification Search
CPC ................. F16M 11/041; F16M 11/46; F16M 2200/028; F16M 2200/066; B25B 5/006
See application file for complete search history.

(56) References Cited

U.S. PATENT DOCUMENTS

| 868,966 | A | * | 10/1907 | Chase | B25B 5/006 |
| | | | | | 269/45 |
| 2,324,803 | A | | 7/1943 | Snyder | |
| 2,823,567 | A | * | 2/1958 | Pothier | B25B 5/006 |
| | | | | | 269/71 |
| 2,887,974 | A | | 5/1959 | Weinfeld | |
| 3,883,128 | A | * | 5/1975 | Breese | B25B 1/22 |
| | | | | | 269/45 |
| 4,070,011 | A | | 1/1978 | Glesser | |
| 4,253,648 | A | * | 3/1981 | Meeks | B25B 5/006 |
| | | | | | 269/203 |
| 4,292,748 | A | * | 10/1981 | Miller | D05C 1/02 |
| | | | | | 108/43 |
| 5,174,531 | A | | 12/1992 | Perakis | |
| 5,421,548 | A | * | 6/1995 | Bennett | A61G 5/10 |
| | | | | | 248/129 |
| 5,671,900 | A | | 9/1997 | Cutler | |
| 6,357,710 | B1 | | 3/2002 | Fielden et al. | |
| 6,390,424 | B1 | * | 5/2002 | Kidushim | A45D 20/12 |
| | | | | | 248/122.1 |
| 6,957,808 | B2 | * | 10/2005 | Varzino | B25B 1/08 |
| | | | | | 269/170 |
| D518,348 | S | | 4/2006 | Fahey | |
| 7,066,457 | B2 | * | 6/2006 | Gerritsen | B25B 5/068 |
| | | | | | 269/3 |
| 7,445,184 | B1 | * | 11/2008 | Johnson | B05B 13/0285 |
| | | | | | 248/176.1 |

(Continued)

FOREIGN PATENT DOCUMENTS

WO  WO9626041  8/1996

*Primary Examiner* — Bradley Duckworth

(57) ABSTRACT

A multi-clamp stand apparatus for handsfree assistance includes a base having front side, a back side, a top side, and a bottom side. A support pole has a bottom end and a top end. The bottom end is coupled to the top side of the base. A clamp collar is coupled to the support pole and is slidably engageable on the support pole from the bottom end to the end. An adjustment mechanism is coupled to the clamp collar and is in operational communication with the support pole to fix and alternatively release the clamp collar and the support pole. An at least one clamp is coupled to the clamp collar.

10 Claims, 4 Drawing Sheets

(56) References Cited

U.S. PATENT DOCUMENTS

| | | | | |
|---|---|---|---|---|
| 8,328,173 | B1* | 12/2012 | DesForge | B25H 1/0007 |
| | | | | 248/176.1 |
| 9,737,064 | B2* | 8/2017 | Durrant | A01K 97/28 |
| 9,757,843 | B2* | 9/2017 | Edge | B25B 5/163 |
| 9,981,332 | B2* | 5/2018 | Teraoka | B23K 3/027 |
| 2008/0106020 | A1* | 5/2008 | Sherlock | B23K 37/0452 |
| | | | | 269/71 |
| 2018/0117738 | A1* | 5/2018 | Klumper | B25B 5/003 |
| 2018/0356032 | A1* | 12/2018 | Crider | F16B 2/005 |

* cited by examiner

MULTI-CLAMP STAND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to clamps and more particularly pertains to a new clamp for handsfree assistance.

BRIEF SUMMARY OF THE INVENTION

An embodiment of the disclosure meets the needs presented above by generally comprising a base having front side, a back side, a top side, and a bottom side. A support pole has a bottom end and a top end. The bottom end is coupled to the top side of the base. A clamp collar is coupled to the support pole and is slidably engageable on the support pole from the bottom end to the end. An adjustment mechanism is coupled to the clamp collar and is in operational communication with the support pole to fix and alternatively release the clamp collar and the support pole. An at least one clamp is coupled to the clamp collar.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 1:
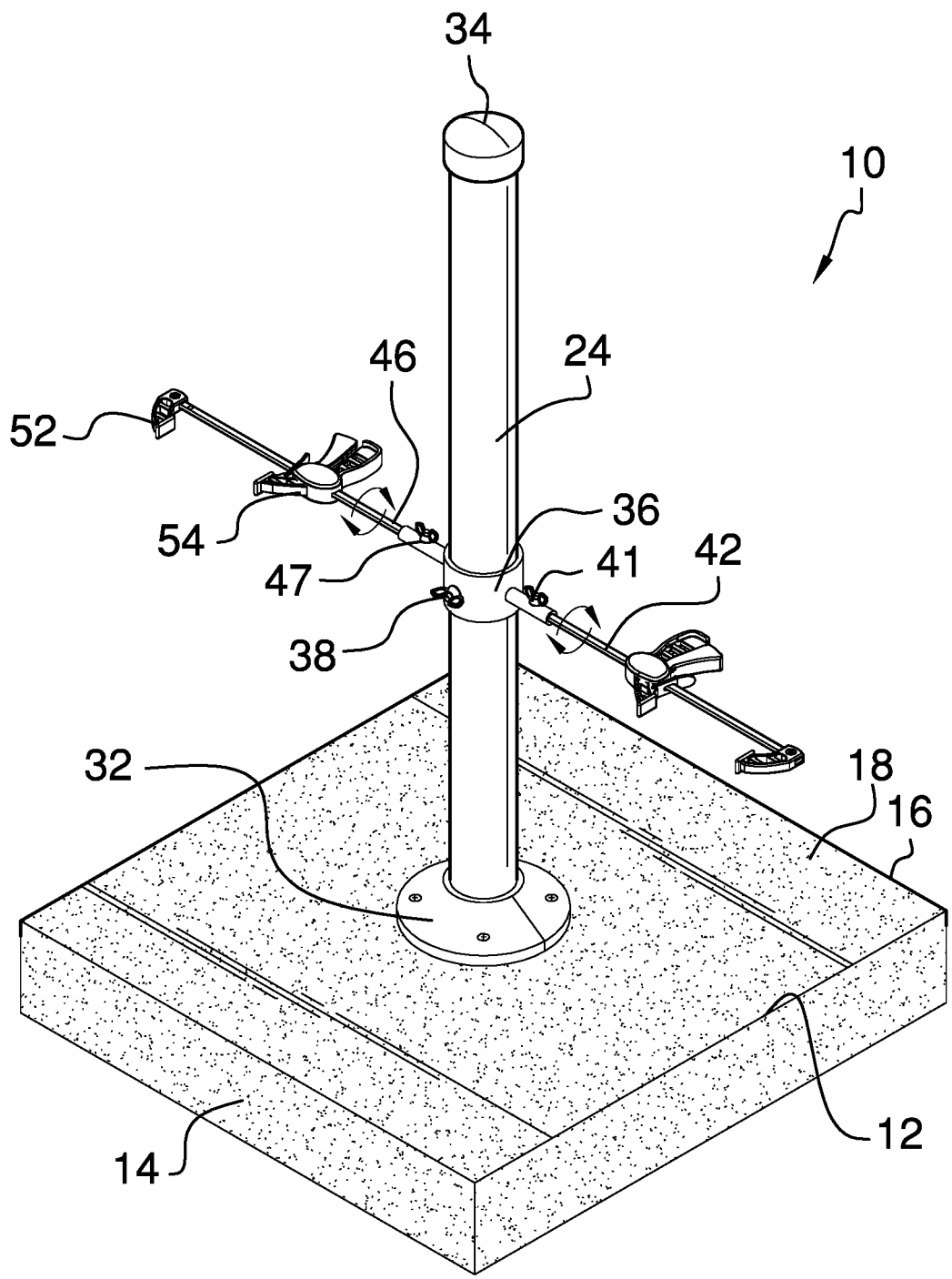
FIG. 1 is an isometric view of a multi-clamp stand apparatus according to an embodiment of the disclosure.
Figure 2:
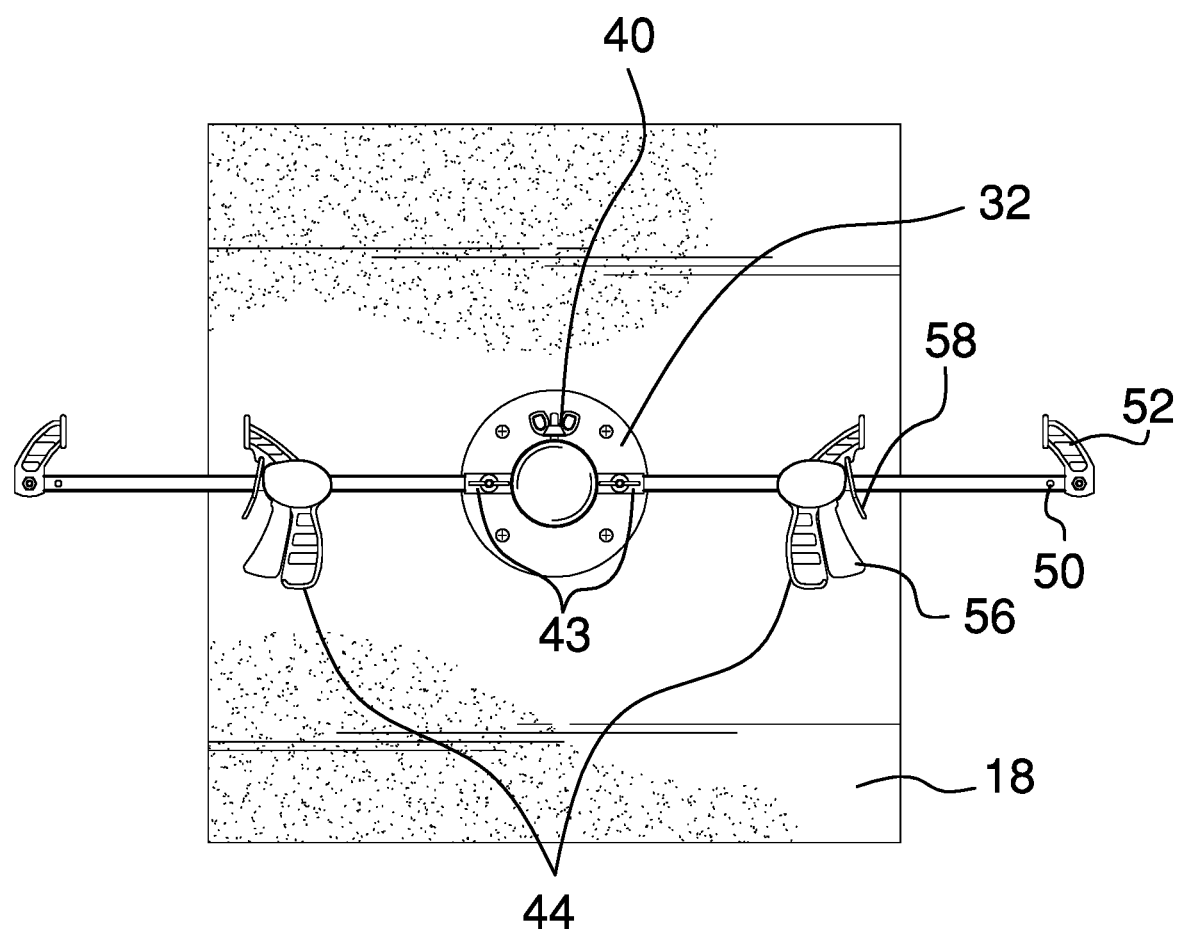
FIG. 2 is a top plan view of an embodiment of the disclosure.
Figure 3:
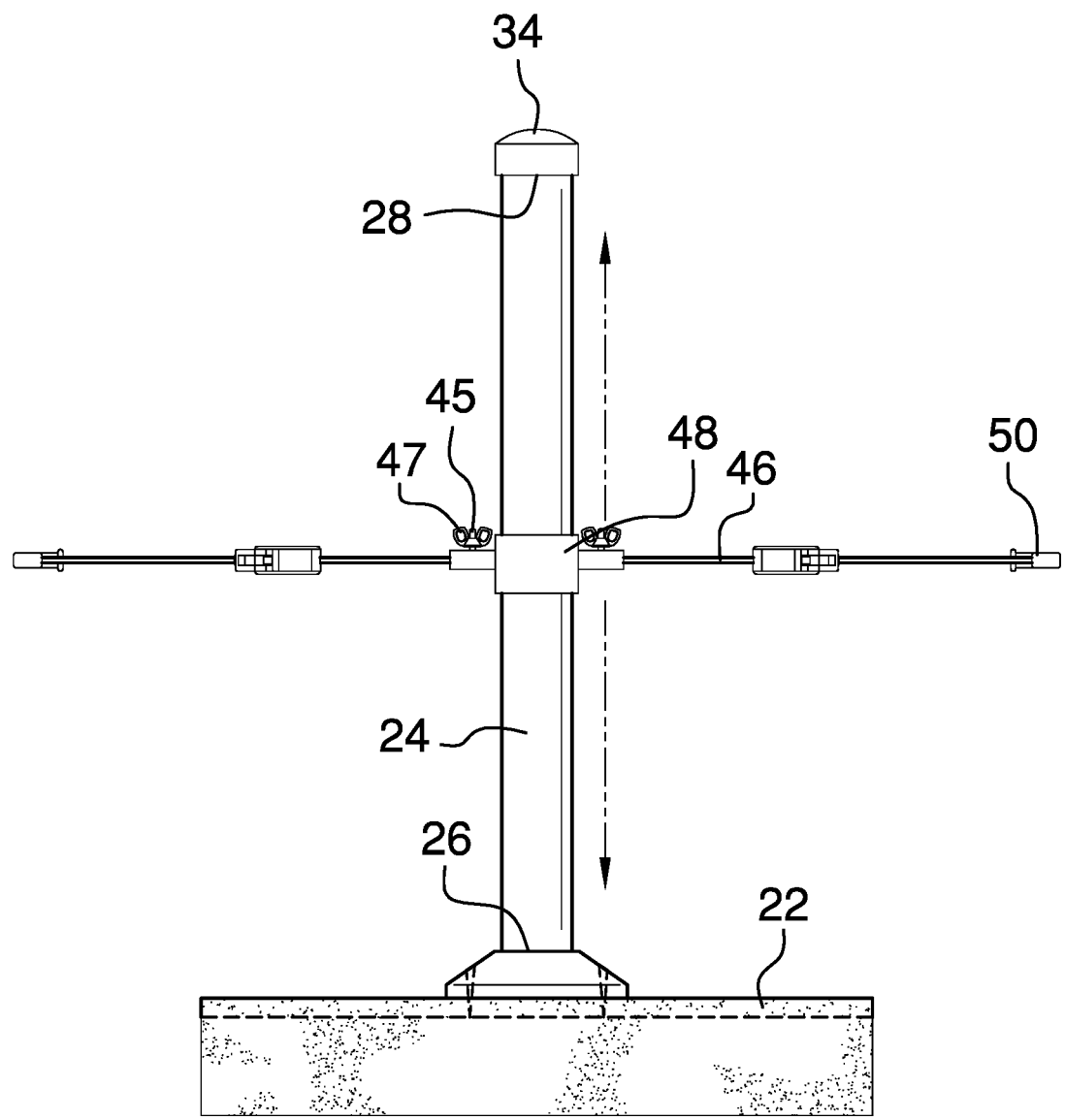
FIG. 3 is a rear elevation view of an embodiment of the disclosure.
Figure 4:
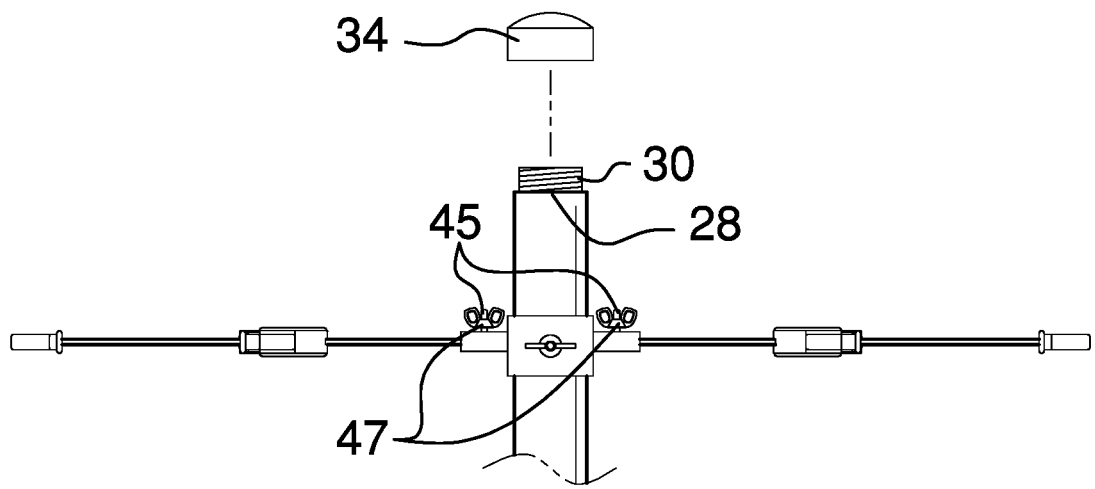
Figure 5:
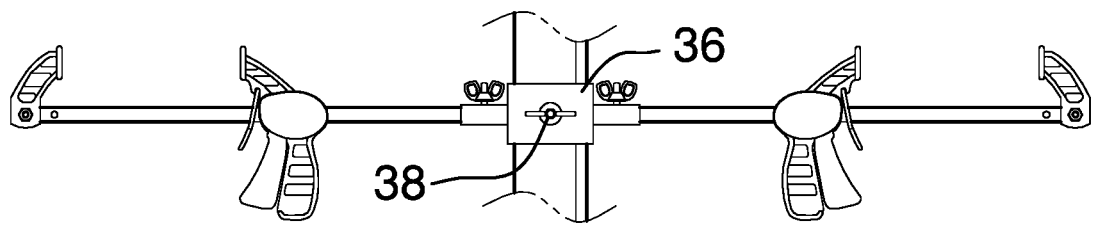
Figure 6:
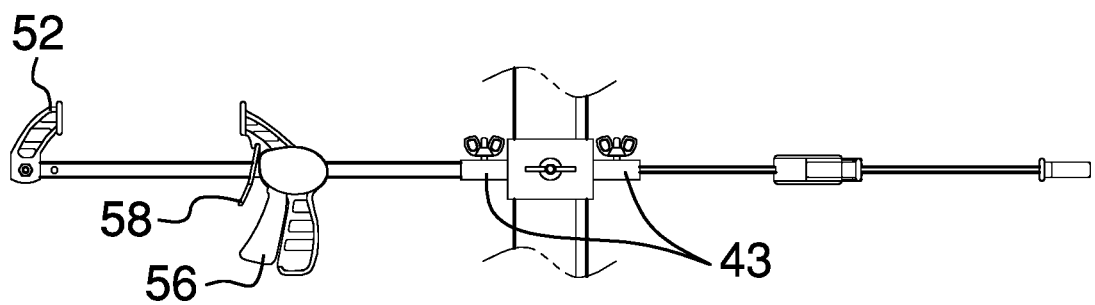

FIG. 4 is a detail view of an embodiment of the disclosure.
FIG. 5 is a detail view of an embodiment of the disclosure.
FIG. 6 is a detail view of an embodiment of the disclosure.

DETAILED DESCRIPTION OF THE INVENTION

With reference now to the drawings, and in particular to FIGS. 1 through 6 thereof, a new clamp embodying the principles and concepts of an embodiment of the disclosure and generally designated by the reference numeral 10 will be described.

As best illustrated in FIGS. 1 through 6, the multi-clamp stand apparatus 10 generally comprises a base 12 having front side 14, a back side 16, a top side 18, and a bottom side 20. The base may be a rectangular prism and may have a rubberized coating 22. The rubberized coating provides protection for the base 12 as well as a non-slip surface for work being performed on the base 12. A support pole 24 is coupled to the base 12 and has a bottom end 26 and a top end 28. The top end 28 may have a threaded portion 30 and the bottom end 26 is coupled to the top side 18 of the base. A flange 32 may be coupled to the base 12 around the bottom end 26 of the support pole for extra support. An end cap 34 is selectively engageable with the threaded portion 30 of the top end of the support pole. A clamp collar 36 is coupled to the support pole. The clamp collar 36 is slidably engageable on the support pole 24 from the bottom end 26 to the end 28. The end cap 34 prevents the clamp collar 36 from sliding off the top end 28 of the support pole. An adjustment mechanism 38 is coupled to the clamp collar 36. The adjustment mechanism 38 may comprise a collar wing nut 40. The collar wing nut 40 tightens to fix the clamp collar 36 to the support pole 24 and alternatively loosens to release the clamp collar 36 to be slidable along, and rotatable around, the support pole 24 to adjust the height from the base 12 and angle relative the front side 14.

An at least one sleeve 41 may be coupled to the clamp collar 36. The at least one sleeve 41 may be a pair of sleeves 43 with each of the pair of sleeves 43 being disposed 180° apart. An at least one clamp 42 may be a pair of clamps 44 with each of the pair of clamps comprising an extension arm 46 having a proximal end 48 and a distal end 50. The proximal end 48 is rotatably coupled within the pair of sleeves 43. A pair of set screws 45 may be coupled to the pair of sleeves 43. The pair of set screws 45 is coupled through each of the pair of sleeves 43 to selectively engage the extension arm 46 of each of the pair of clamps 44. Each set screw of the pair of set screws 45 may have a screw wing nut 47 to tighten and alternatively loosen the pair of set screws 45 to prevent and alternatively enable rotation of the pair of clamps 44. The pair of clamps 44 may alternatively be directly coupled to the clamp collar 36 with both oriented parallel the top side 18, one may be oriented parallel the top side 18 and one being oriented 90° relative the top side 18, or both may be oriented 90° relative the top side 18.

Each of the pair of clamps 44 may further comprise a clamp terminal 52 coupled to the distal end 50 of the extension arm and a trigger clamp 54 coupled to the extension arm 46. Each trigger clamp 54 may have a squeeze trigger 56 and a release trigger 58. The squeeze trigger 56 advances the trigger clamp 54 along the extension arm 46 towards the clamp terminal 52 and the release trigger 58 releasing the trigger clamp 54 to slide away from the clamp terminal 52.

In use, a user loosens the collar wing nut 40 of the adjustment mechanism 38 to adjust the height and angle of the clamp collar 36 to position the pair of clamps 44 where desired. The squeeze trigger 56 is then pulled to clamp objects between the squeeze trigger 56 and the clamp terminal 52. The objects can then be held and worked on without requiring an extra hand to hold them in place. When done, the release trigger 58 is squeezed to unclamp the objects.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multi-clamp stand apparatus comprising:
   a base, the base having a front side, a back side, a top side, and a bottom side;
   a support pole coupled to the base, the support pole having a bottom end and a top end, the bottom end being coupled to the top side of the base;
   a clamp collar coupled to the support pole, the clamp collar being slidably engageable on the support pole from the bottom end to the top end;
   an adjustment mechanism coupled to the clamp collar, the adjustment mechanism being in operational communication with the support pole to fix and alternatively release the clamp collar and the support pole; and
   a plurality of clamps, each clamp being coupled to the clamp collar, each of the clamps comprising
      an extension arm having a proximal end and a distal end, the proximal end being coupled to the clamp collar,
      a clamp terminal coupled to the distal end of the extension arm, and
      a trigger clamp coupled to the extension arm, the trigger clamp being slidably engageable along the extension arm, the trigger clamp having a squeeze trigger and a release trigger, the squeeze trigger advancing the trigger clamp along the extension arm towards the clamp terminal and the release trigger releasing the trigger clamp to slide away from the clamp terminal; and
   a plurality of sleeves, each sleeve being coupled to the clamp collar, a central axis of each sleeve intersecting a center of the clamp collar such that each sleeve extends radially outward from the clamp collar, the extension arm of an associated one of the clamps being rotatably coupled within each sleeve.

2. The multi-clamp stand apparatus of claim 1 further comprising a plurality of set screws, each set screw being coupled through an associated one of the sleeves, such that each set screw is selectively engageable with the extension arm to prevent rotation of the extension arm relative to the associated sleeve.

3. The multi-clamp stand apparatus of claim 2 further comprising each set screw having a screw wing nut to facilitate tightening and alternatively loosening the set screw.

4. The multi-clamp stand apparatus of claim 1 further comprising the adjustment mechanism comprising a collar wing nut, the collar wing nut tightening to fix the clamp collar to the support pole and alternatively loosening to release the clamp collar to be slidable along the support pole.

5. The multi-clamp stand apparatus of claim 1 further comprising a flange and an end cap, the flange being coupled to the base around the bottom end of the support pole, the end cap being coupled to the top end of the support pole.

6. The multi-clamp stand apparatus of claim 5 further comprising the top end of the support pole having a threaded portion, the end cap being selectively engageable with the threaded portion.

7. The multi-clamp stand apparatus of claim 1 further comprising the base being a rectangular prism, the base having a rubberized coating.

8. The multi-clamp stand apparatus of claim 1 further comprising the plurality of sleeves being a pair of sleeves, and the plurality of clamps being a pair of clamps, the pair of sleeves being linearly aligned and positioned on diametrically opposite sides of the clamp collar such that the sleeves and clamps are disposed 180° apart around the clamp collar.

9. The multi-clamp stand apparatus of claim 8 further comprising each of the clamps being independently rotatable relative to the top side of the base such that the pair of clamps are positionable to be both oriented parallel the top side, one being oriented parallel the top side and another one being oriented 90° relative the top side, or both clamps being oriented 90° relative to the top side.

10. A multi-clamp stand apparatus comprising:
   a base, the base having a front side, a back side, a top side, and a bottom side, the base being a rectangular prism and having a rubberized coating;
   a support pole coupled to the base, the support pole having a bottom end and a top end, the top end having a threaded portion, the bottom end being coupled to the top side of the base;
   a flange, the flange being coupled to the base around the bottom end of the support pole;
   an end cap, the end cap being being selectively engageable with the threaded portion of the top end of the support pole;
   a clamp collar coupled to the support pole, the clamp collar being slidably engageable on the support pole from the bottom end to the top end;

an adjustment mechanism coupled to the clamp collar, the adjustment mechanism comprising a collar wing nut, the collar wing nut tightening to fix the clamp collar to the support pole and alternatively loosening to release the clamp collar to be slidable along the support pole;

a pair of sleeves coupled to the clamp collar, a central axis of each sleeve intersecting a center of the clamp collar such that each sleeve extends radially outward from the clamp collar, each of the pair of sleeves being disposed 180° apart around the clamp collar;

a pair of clamps coupled to the pair of sleeves, each of the pair of clamps comprising an extension arm having a proximal end and a distal end, the proximal end being rotatably coupled within an associated one of the pair of sleeves, each of the pair of clamps further comprising a clamp terminal coupled to the distal end of the extension arm and a trigger clamp coupled to the extension arm, each trigger clamp having a squeeze trigger and a release trigger, the squeeze trigger advancing the trigger clamp along the extension arm towards the clamp terminal and the release trigger releasing the trigger clamp to slide away from the clamp terminal, each of the pair of clamps having rotational orientation relative the top side of the base; and a pair of set screws coupled to the pair of sleeves, the pair of set screws being coupled through each of the pair of sleeves, each set screw of the pair of set screws having a screw wing nut, the screw wing nut tightening and alternatively loosening the pair of set screws, the pair of set screws being selectively engageable with the extension arm to prevent rotation of the pair of clamps.

\* \* \* \* \*